(12) United States Patent
Crisp

(10) Patent No.: US 6,749,235 B1
(45) Date of Patent: Jun. 15, 2004

(54) PRESSURE ACTUATED LOCKING DEVICE

(76) Inventor: David John Crisp, 77 Eleanor Road, London (GB), E8 1DN ( * ) Notice: Subject to any disclaimer, the term of this patent is extended or adjusted under 35 U.S.C. 154(b) by 0 days.

(21) Appl. No.: 09/202,427

(22) PCT Filed: Jun. 18, 1997

(86) PCT No.: PCT/GB97/01643
§ 371 (c)(1),
(2), (4) Date: Dec. 15, 1998

(87) PCT Pub. No.: WO97/48603
PCT Pub. Date: Dec. 24, 1997

(30) Foreign Application Priority Data

Jun. 18, 1996 (GB) ............................................... 9612688
Feb. 14, 1997 (GB) ............................................... 9703041

(51) Int. Cl.[7] .............................................. B65D 27/30
(52) U.S. Cl. ............................... 292/317; 292/DIG. 65; 70/DIG. 48
(58) Field of Search ........................ 292/317, DIG. 73, 292/DIG. 65, DIG. 25; 70/DIG. 48; 244/118.5, 149, 129.4

(56) References Cited

U.S. PATENT DOCUMENTS

| | | | |
|---|---|---|---|
| 2,937,831 A | * 5/1960 | Mayo et al. | 244/149 |
| 3,690,605 A | 9/1972 | Jones | 244/149 |
| 3,981,302 A | 9/1976 | Veit | 128/203 |
| 4,023,874 A | * 5/1977 | Jong et al. | 312/291 |
| 4,552,326 A | 11/1985 | Bokalot | 244/129.5 |
| 4,681,286 A | * 7/1987 | Church et al. | 244/129.5 |
| 4,783,027 A | * 11/1988 | Jones | 244/149 |
| 5,062,669 A | * 11/1991 | McManigal et al. | 292/60 |
| 5,118,053 A | * 6/1992 | Singh et al. | 244/144 |
| 5,421,177 A | 6/1995 | Sieber et al. | 70/57.1 |

FOREIGN PATENT DOCUMENTS

| | | |
|---|---|---|
| GB | 883044 | 11/1961 |
| GB | 2 051 212 | 1/1981 |
| GB | 2 150 206 | 6/1985 |
| GB | 2 300 874 | 11/1996 |
| GB | 2 304 799 | 3/1997 |

* cited by examiner

Primary Examiner—B. Dayoan
Assistant Examiner—John B. Walsh
(74) Attorney, Agent, or Firm—McDermott, Will & Emery

(57) ABSTRACT

A pressure-sensitive locking device comprises a housing (2,20) having an opening therein, and an insertable member (1,21) adapted to be inserted into the opening whereupon it can enter into locking engagement with a locking member (4,36) in the housing. The locking member (4,36) is cooperable with pressure-sensitive means (7,28) in the housing to effect disengagement between the locking member (4,36) and the insertable member (1,21) upon a reduction of pressure.

10 Claims, 5 Drawing Sheets

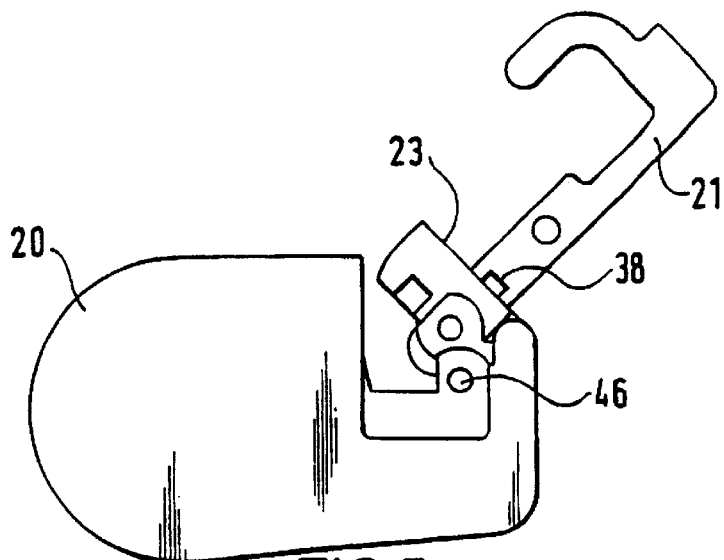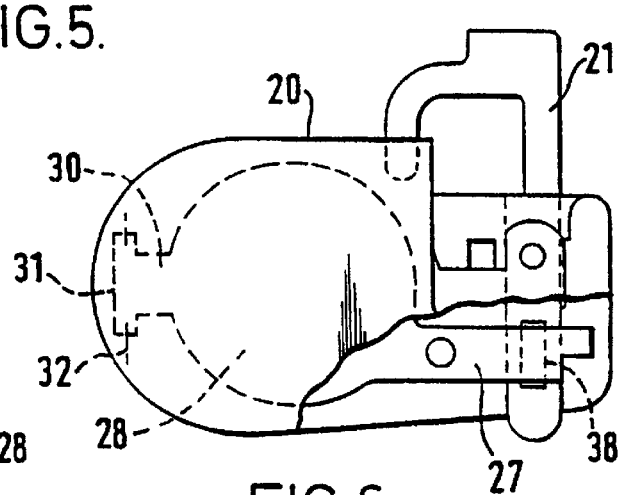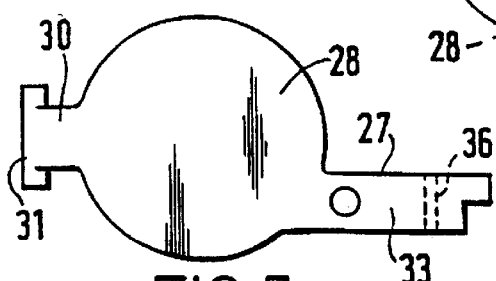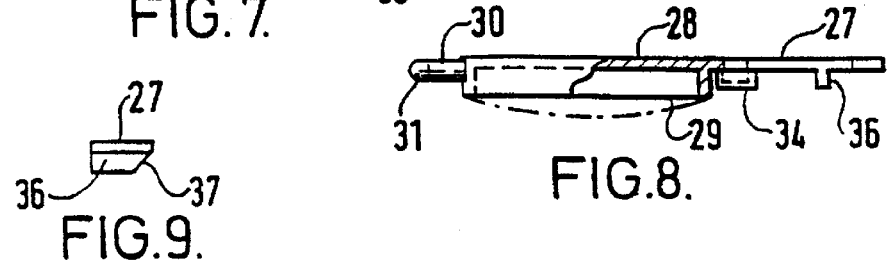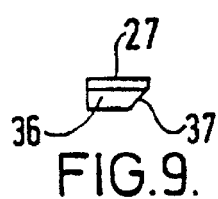

US 6,749,235 B1

PRESSURE ACTUATED LOCKING DEVICE

FIELD OF THE INVENTION

This invention relates to a locking device, and more particularly to a locking device which is automatically engageable or disengageable upon a change in pressure.

BACKGROUND OF THE INVENTION

A particular application for such a locking device is as a security seal for use on passenger aircraft. The device can be used to seal the containers used for the in-flight distribution of perishable and non-perishable goods. The theft of goods from containers costs airlines vast sums of money each year. Although containers are sealed when they leave the warehouse, it is necessary for the seals to be easily removable by hand as it is quite impractical for cabin crews to carry special seal removal tools on the aircraft. We have found that these problems can be solved by a locking device which is pressure-sensitive; the device thus being actuated by the reduced pressure during flight.

SUMMARY OF THE INVENTION

The present invention thus provides a pressure-sensitive locking device comprising a housing having an opening therein, an insertable member adapted to be inserted into the housing through the opening, and a locking member in the housing, the locking member being biased towards engagement with the insertable member so that the locking member is lockably engageable with the insertable member upon insertion of the insertable member into the housing, and the locking member being cooperable with pressure-sensitive means pressure-sensitive arrangement in the housing to effect disengagement of the locking member from the insertable member upon a reduction of pressure.

In a preferred embodiment, the locking member is resiliently biased towards the insertable member when inserted in the housing so as to be in locking engagement therewith under normal atmospheric pressure. When the pressure is reduced, for example when an aircraft achieves a predetermined altitude, the pressure-sensitive means effects disengagement of the locking member from the insertable member, whereupon the insertable member can be withdrawn from the housing.

The opening in the housing preferably communicates with a channel, and the insertable member is preferably elongate and adapted to be slidingly inserted lengthwise through the opening into the channel.

The locking device can serve both as a barrier seal and as an indicative seal. The elongate member can be shaped so as to engage with a hasp or other securing device of an aircraft goods container. Alternatively, the elongate member can be U or J-shaped whereby the limbs can be inserted in two channels in the housing and lockable in one or both such channels, the device then being usable in the same way as a padlock. The locking device preferably includes an additional disposable locking element which engages with the elongate member in the locked position, and which has to be physically broken to permit withdrawal of the elongate member from the channel.

BRIEF DESCRIPTION OF THE DRAWINGS

Reference is now made to the accompanying drawings, in which:

FIG. 5 is a plan view of the second embodiment when ready to be locked;

FIG. 6 is a plan view of the second embodiment in the locked position, and partly cutaway to show internal details;

FIG. 7 is a view of a combined capsule and locking member used in the second embodiment;

FIG. 8 is a side view corresponding to FIG. 7;

FIG. 9 is a partial end view corresponding to FIGS. 7 and 8;

DETAILED DESCRIPTION OF THE INVENTION

Figure 1:
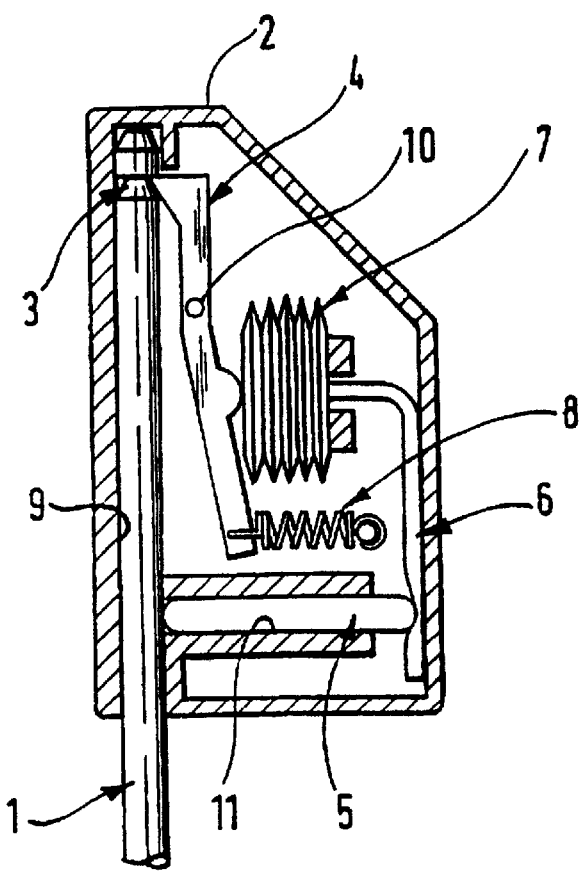
FIG. 1 is a diagrammatic representation, partly in cross-section, of a locking device according to a first embodiment of the invention, the device being shown in the locked condition.
Figure 2:
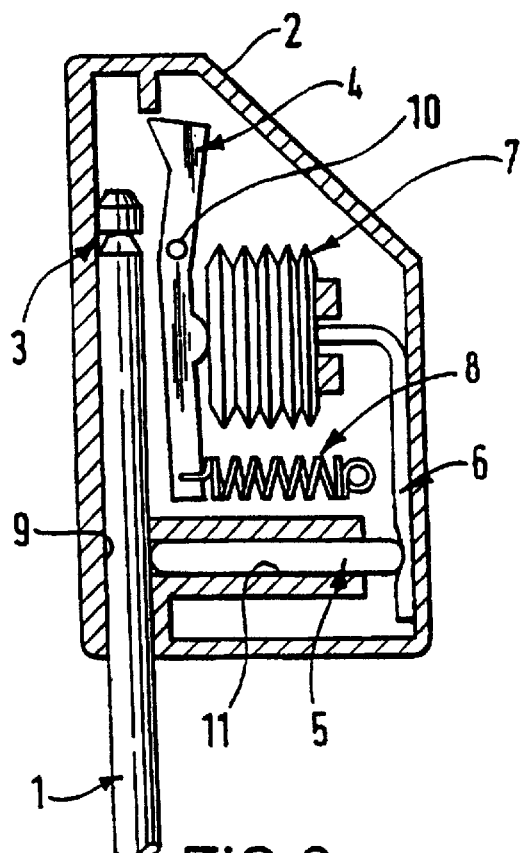
FIG. 2 is a view corresponding to FIG. 1 but with the device unlocked.

Referring first to FIGS. 1 and 2, there is shown a housing 2 with a channel 9 defined therein. An elongate member in the form of a bar 1 of cylindrical section is able to slide within the channel. The bar 1 has a tapered head and immediately behind this a groove 3. A locking member 4 is provided within the housing and is rotatable about an axis 10. One end of the locking member has an enlarged head shaped so as to engage with the groove 3 of the bar 1. An opposite end of the locking member 4 is engaged with one end of a helical spring 8, the other end of which is mounted in the housing 2. The spring 8 resiliently biases the locking member 4 into locking engagement with the groove 3 of the bar 1. When the bar 1 is initially inserted into the channel 9, the tapered head of the bar slides past a sloping surface of the head of the locking member 4, thereby deflecting the locking member against its spring bias, and then the locking member snaps into engagement with the groove 3. The locking engagement between the locking member 4 and the groove 3 prevents withdrawal of the bar 1 from the channel 9.

Also provided within the housing is a pressure-sensitive means in the form of a capsule 7 which communicates with a tube 6 but is otherwise air-tight. The capsule 7 has concertina-like flexible side walls to permit expansion and contraction. An elongated sliding element 5 with rounded ends is provided in a transverse channel 11 which adjoins the channel 9. Before insertion of the bar 1, one end of the sliding element 11 projects slightly into the channel 9. As the bar 1 is inserted, it deflects the sliding element 5 to one side so that it slides further into the transverse channel 11. This causes the opposite end of the sliding element 5 to press against the side of the tube 6, which is of flexible material. The tube 6 is thereby sealed at this point, with the result that the capsule 7 is completely air-tight.

As the pressure is reduced, for example, as an aircraft increases altitude, the pressure of the air enclosed within the capsule 7 becomes greater than that of the surrounding air, with the result that the capsule expands, as shown in FIG. 2. An end of the capsule 7 abuts against a rounded contact point on the locking piece 4, intermediate the axis 10 and contact point of the spring 8. Expansion of the capsule 7, as shown in FIG. 2, thus causes the locking piece 4 to pivot about the axis 10, whereby the head of the locking piece 4 becomes disengaged from the groove 3 in the bar 1. The bar 1 can then be freely withdrawn from the channel 9. Once the bar 1 has been withdrawn, the sliding element 5 ceases to be pressed against the tube 6, and the natural resilience of the tube 6 pushes the sliding element 5 back towards the channel 9. Air can therefore pass from within the capsule 7 and out through the tube 6, thereby equalising the pressures inside and outside the capsule 7. The spring 8 will then cause pivoting of the locking piece 4 about the axis 10, so that the head of the locking piece 4 once more projects into the channel 9. If the bar 1 is then reinserted into the channel 9, it will again engage with the head of the locking piece 4 to effect locking. Once this position has been reached, and without any further reduction in pressure, unlocking of the device can only be achieved by destruction of parts thereof, for example by cutting the bar 1. If desired, a special tool could be designed to disengage the locking piece 4 from the bar 1, although such an arrangement would be inherently less secure.

The locking device described above is typically used to seal a goods container, for example a drinks trolley, for use on an aircraft. The trolley is filled at the warehouse and then locked with the locking device. If the trolley is to be inspected by authorised personnel while still on the ground, the locking device is opened by cutting the bar, and the trolley is then locked with a new locking device. The locking device can thus only be opened on the ground by destroying at least part of it, and thus any interference with the trolley is readily apparent to an inspector. Once on the aircraft, above a designated altitude, the locking device is automatically unlocked by the reduced pressure. The trolley can then be used in the normal way, and after use it can be relocked with the same locking device. Thereafter, the locking device can again only be unlocked by destruction of at least part of it, which would be done by authorised personnel. Again, any unauthorised interference would be readily apparent to an inspector.

Referring now to FIGS. 3 to 12, a second embodiment of the invention is described. The locking device shown includes a housing 20, an insertable member in the form of a flat bar 21 and a disposable locking element 22. The housing has a hinged guide member 23, pivoted to an end portion 24 of the housing. The guide member 23 is able to pivot between an open position (FIG. 5) and a closed position (FIG. 6). The guide member 23 has an opening 25 for receiving the bar 21, and in the closed position the opening 25, which extends through the guide member, is in register with openings at opposing ends of the main body of the housing 20, so as to effectively form a channel through the housing.

The bar 21 is J-shaped. An end portion of the longer limb can be pre-placed in the opening 25 of the guide member 23, with the guide member in the open position as shown in FIG. 5. In order to effect locking, as described in more detail below, the guide member 23 is then rotated to the closed position (FIG. 6) and the longer limb of the bar 21 is then fully inserted in the channel of the housing 20, the end portion of the longer limb projecting slightly from the other side of the housing (FIG. 6). The shorter limb of the bar 21 is received in an opening 26 in a side wall of the housing, and in the locked position travels to a short extent through the opening into the interior of the housing (FIG. 6). The fit of the end of the longer limb of the bar 21 in the opening 25 is sufficiently close that the bar 21 can be held by the guide member 23, as shown in FIG. 5, but does not impede further insertion of the bar 21 through the opening 25 until the bar reaches the locked position, as shown in FIG. 6.

Inside the housing 20 is a locking member 27 which incorporates a pressure-sensitive device in the form of a sealed capsule 28. The capsule 28 is in the form of a shallow cylindrical cup, one end of which is sealed by an elastomeric membrane 29. The cup and the membrane define a closed space. A short extension piece 30 to one side of the capsule terminates in a transverse hinge member 31 which cooperates with a hinge support 32 inside and at one end of the housing 20. Extending from the opposite side of the capsule 28, but slightly offset from the extension piece 30, is an arm 33. On the underside of the arm, close to the capsule 28, there is formed a cylindrical cup 34 for receiving an end of a helical spring 35, the other end of the spring being mounted on an internal wall of the housing. By virtue of the hinge 31 and the spring 35, the arm 33 of the locking member is biased away from the internal wall of the housing on which the spring 35 is mounted. Also on the underside of the arm 33, but closer to its free end, there is an integral locking piece 36 in the form of a ridge having a sloping ramp 37 at one side (FIG. 9).

The bar 21 has a rectangular slot 38 towards the end of its longer limb. As the bar 21 is inserted into the housing, the leading edge of its longer limb passes under the arm 33 of the locking member. The leading edge first strikes the ramp 37 of the locking piece 36, and rides up the ramp, thereby pressing the arm 33 against the bias of the spring 35. On further insertion, the locking piece 36 becomes level with the slot 38 in the bar 21, and at this point the spring 35 causes the arm 33 with its integral locking piece 36 to snap into engagement with the slot 38. Attempted withdrawal of the bar 21 is prevented by engagement between the end of the locking piece 36, opposite to the ramp 37, with the trailing end (on extraction) of the slot 38.

Figure 10:
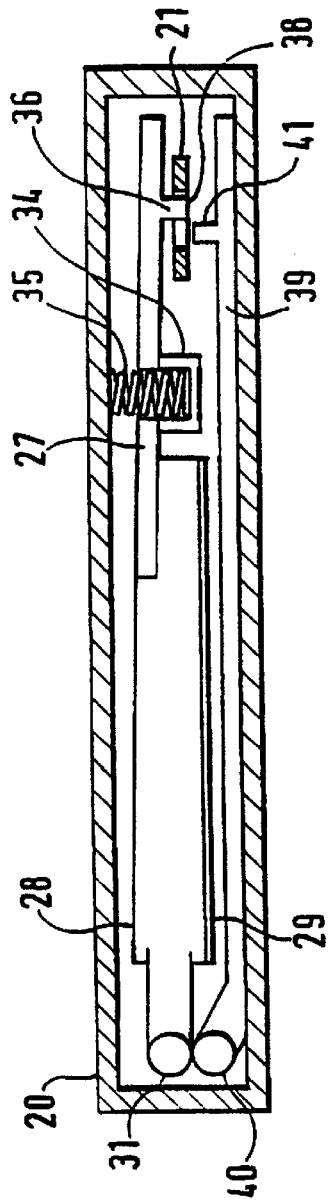
FIG. 10 is a part-sectional side view showing the operation of the combined capsule and locking member of the second embodiment in the locked condition.
Figure 11:
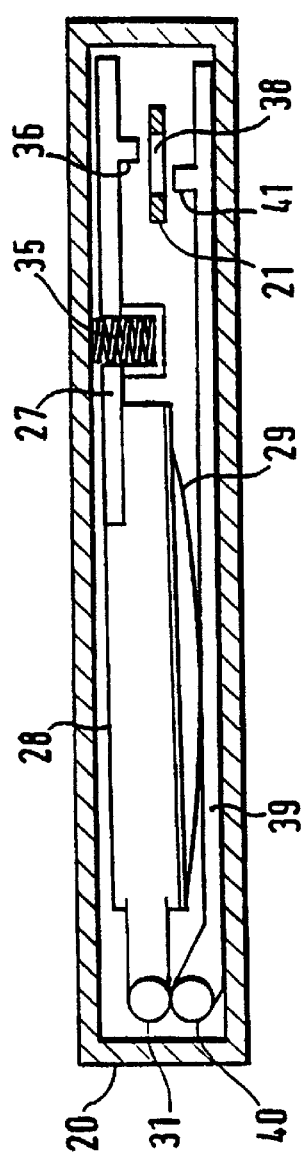
FIG. 11 corresponds to FIG. 10 and shows the device unlocked by a reduction in air pressure.
Figure 12:
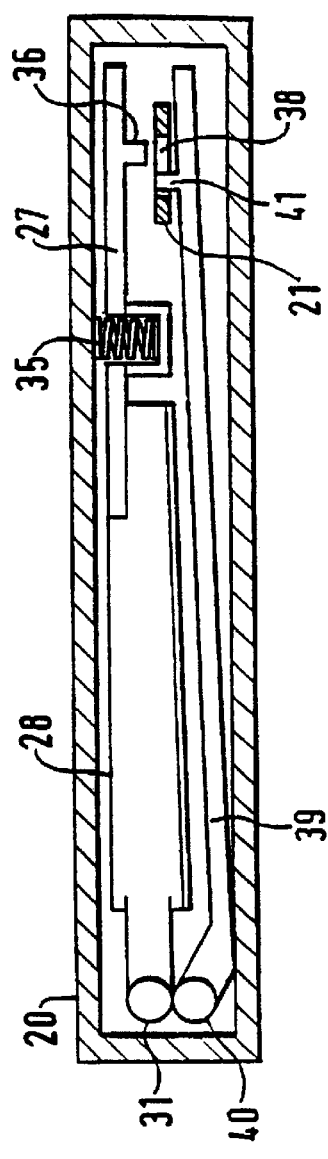
FIG. 12 corresponds to FIGS. 10 and 11 and shows the operation of a secondary locking member to prevent unauthorised or accidental "shock" opening.
Figure 13:
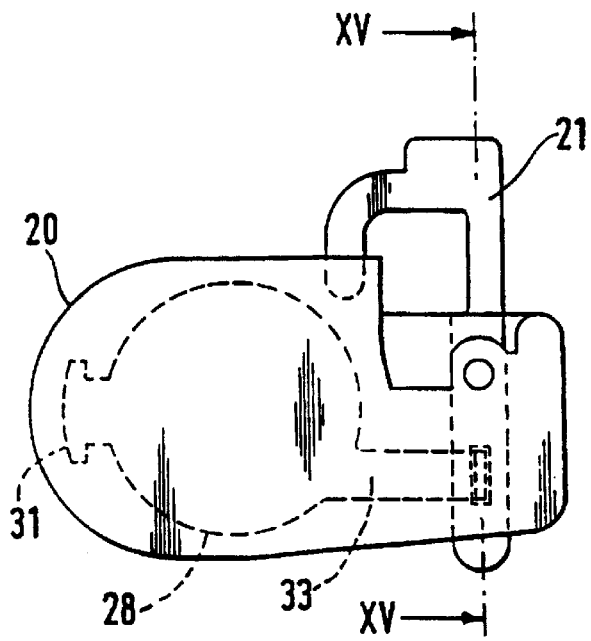
FIGS. 13 and 14 are diagrammatic plan views showing a modification of the second embodiment.
Figure 15:
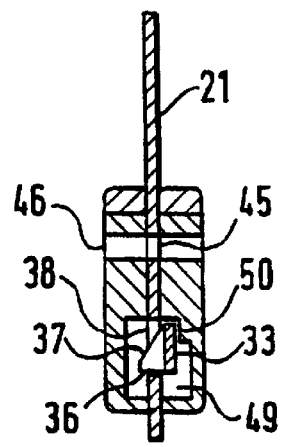
FIGS. 15 and 16 are sectional views corresponding respectively to FIGS. 13 and 14.

In this position, the bar 21 is securely locked in the housing 20. With this arrangement, there is a risk that a sharp blow to one side of the housing, closest to the underside of the arm 33, could momentarily deflect the arm against the spring 35, which would permit the bar 21 to be withdrawn (referred to herein as "shock opening"). Such a blow could be inflicted deliberately in an attempt to interfere with the locking device, or by accident. In order to overcome this problem, there is provided a secondary locking member 39 (FIGS. 10 to 12). The secondary locking member 39 is shaped similarly to the locking member 27 except that it does not have the capsule 28. The secondary locking member 39 has at one end a hinge member 40 which is mounted inside the housing close to the hinge member 31 of the locking member 27. Close to its opposite end, there is an integral upstanding locking piece 41, similar to the locking piece 36 but without a ramp. As shown in FIG. 10, the secondary locking member 39 normally lies alongside an internal wall of the housing, with the locking piece 41 close to but not actually engaged with the slot 38 of the bar 21. In this position, if a sharp blow is applied to the housing wall adjacent the secondary locking member, the locking member 27 may be momentarily deflected out of engagement with the slot 38, as shown in FIG. 12. However, such a blow will deflect the secondary locking member 39 in the same direction, and this will be into locking engagement between the locking piece 41 and the slot 38. The slot 38 is designed to be sufficiently wide that both locking pieces 36 and 41, which are offset from each other, can be accommodated. When the effect of the sharp blow has subsided, the spring 35 returns the locking member 27 and locking piece 36 into engagement with the slot 38 of the bar 21, and the arrangement is again as shown in FIG. 10.

When the locking device is in the locked position (FIG. 10) a predetermined reduction in ambient pressure will cause it to be unlocked. When the ambient pressure is reduced, the pressure of the air enclosed in the sealed capsule 27 causes the elastomeric membrane 29 to expand outwardly. This membrane abuts against the surface of the secondary locking member 39, which in turn abuts against the internal surface of the housing. The result is that the locking member 27, by virtue of its hinge 31, is pressed against the bias of the spring 35, and the locking piece 36 is raised out of engagement with the slot 38, as shown in FIG. 11. The locking device is then unlocked, and the bar 21 can be withdrawn. The elastomeric grade of the membrane 29 can be adapted to provide locking devices which will be unlocked over a range of predetermined pressure changes.

Figure 3:
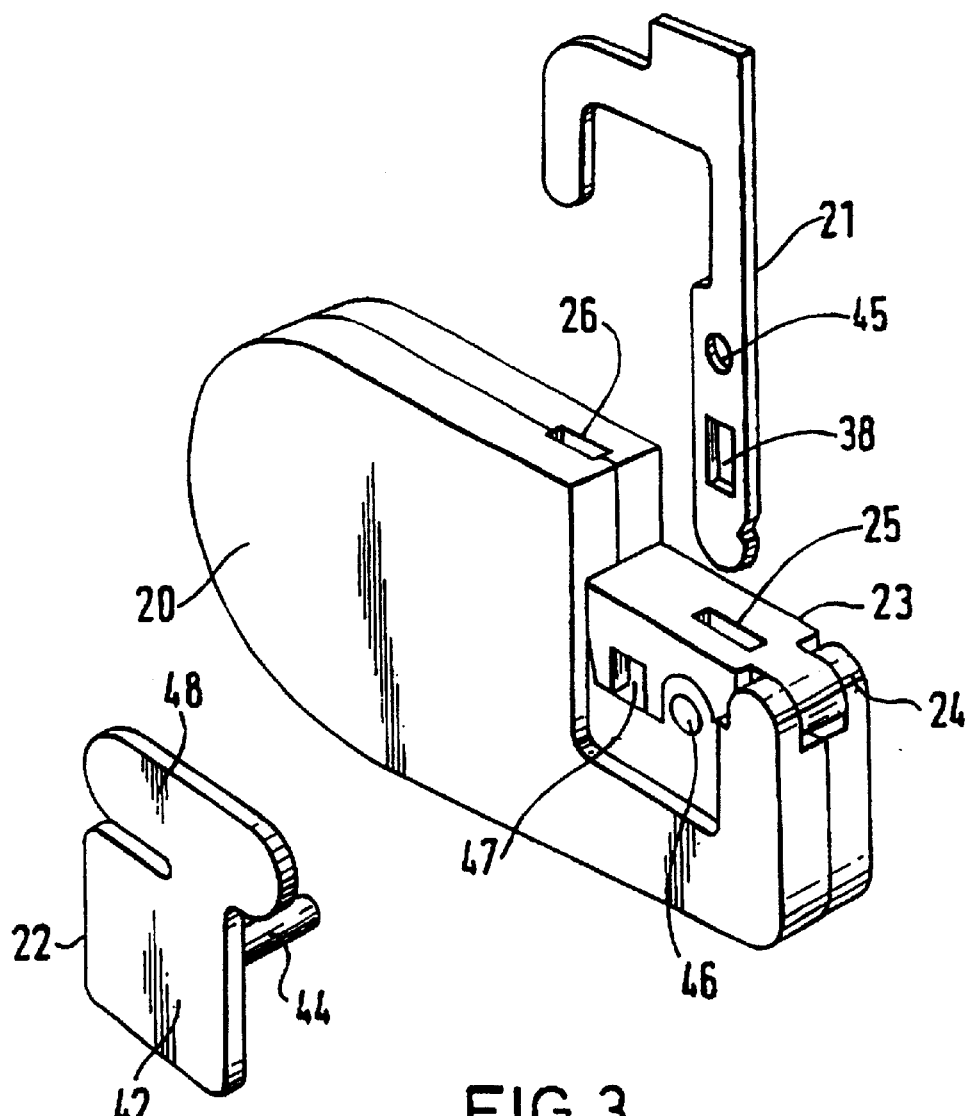
FIG. 3 is an exploded perspective view of a locking device according to a second embodiment of the invention.
Figure 4:
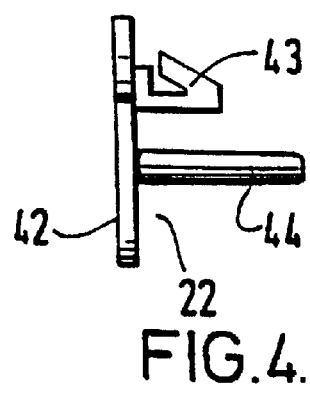
FIG. 4 is an end view of a disposable locking element used in the second embodiment.

The locking device includes a supplementary security seal in the form of a disposable locking element 22 (FIGS. 3 and 4). The disposable locking element 22 includes a head part 42 in the form of a flat tab, and upstanding on one side thereof a plug part 43 and a locking post 44. The disposable locking element 22 cooperates with the guide member 23 (which is part of the housing 20) and the bar 21 in the following manner.

The bar 21 has a circular hole 45 in its longer limb spaced from the trailing end (on insertion) of the slot 38. The guide member 23 has a corresponding through hole 46 whereby, when the bar 21 is locked in the housing 20, the holes 45 and 46 are in register and can receive the locking post 44 of the disposable locking element 22. The guide member 23 has a hollow interior, with an opening 47 spaced to one side of the hole 46. The plug part 43 of the disposable locking element is in the form of a resilient barb. The plug part 43 passes through the opening 47 as the locking post 44 is inserted through the holes 46 and 45. As the plug part 43 passes through the opening 47, the barb is resiliently deflected to one side, but as soon as it is inside the guide member 23, the barb resiliently returns to its original dimensions, and resists withdrawal. In this position, the bar 21, as well as being locked by the locking member 27 inside the housing, is additionally locked by the locking post 44. Thus, even when a reduction in pressure has caused the locking member 27 to disengage from the bar 21, the disposable locking element 22 must additionally be released in order to withdraw the bar 21.

The head part 42 incorporates a tear line which separates the parts of the head part respectively attached to the plug part 43 and the locking post 44. Thus, by manual manipulation, which is assisted by a pull tab 48, the disposable locking element can be split into two parts. The locking post 44 can then be freely withdrawn, permitting release of the bar 21. The plug part 43 remains inside the guide member 23 but the guide member 23 can now be freely rotated to the open position, thereby releasing the plug part. The disposable locking element 22 can be marked for security purposes, such as with a serial number or bar code. If desired, the locking device can be relocked using a new disposable locking element.

Figure 14:
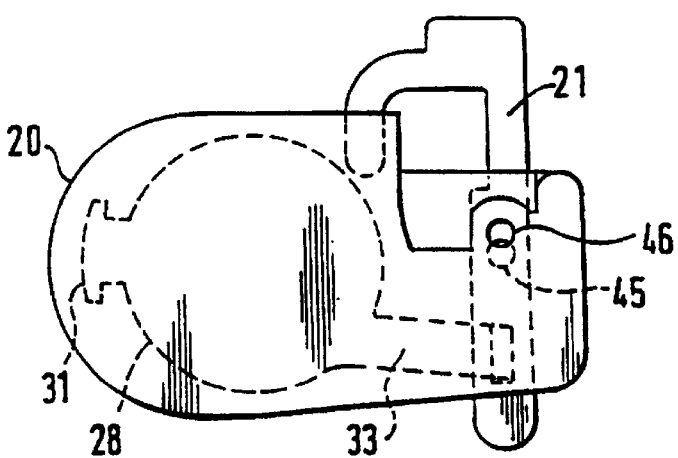
Figure 16:
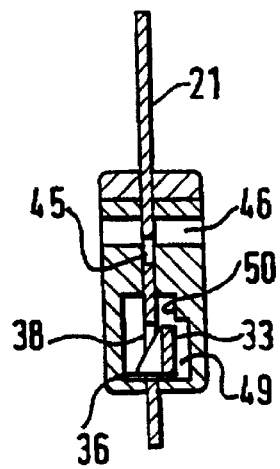

FIGS. 13 to 16 illustrate a modification of the second embodiment of the invention (FIGS. 3 to 12). Instead of the secondary locking member 39 (which is absent in FIGS. 13 to 16), shock opening is prevented by modifying an internal chamber 49 in the housing and allowing a loose fit of the hinge 31. The loose fit permits a small amount of sideways movement of the arm 33, whereby the bar 21 can be pushed slightly beyond its normal locking position (FIGS. 13 and 15) to an extended position (FIGS. 14 and 16). The effect of this can be seen by comparing FIG. 15, which is a section on the line XV—XV of FIG. 13, with FIG. 16, which is a similar section corresponding to FIG. 14. The chamber 49 is provided with a step 50 near the point of entry of the bar 21. The step 50 is dimensioned such that the thickness of the arm 33 can just fit between the step 50 and the bar 21. Thus, in the normal locking position shown in FIGS. 13 and 15, the step 50 prevents shock opening. Shock opening can only be achieved if the bar 21 is pulled away from the housing simultaneously with applying the shock, and in this position the step 50 prevents movement of the arm 33 to take the locking piece 36 out of engagement with the bar 21.

When a fall in pressure permits normal opening (in the manner already described), the disposable locking element 22 is first extracted. The bar 21 can then be pushed into the extended position (FIGS. 14 and 16), where the holes 45 and 46 are now slightly out of register. The arm 33 is now moved off the step 50. The spring 35 will cause it to remain in engagement with the bar 21 (as shown in FIGS. 14 and 16). However, if the pressure has fallen sufficiently, the expansion of the capsule 28 will cause the arm 33 to move out of engagement with the bar 21. The bar 21 can then be pulled out of the housing as described above.

There may be a need to inspect a container locked by the locking device while still on the ground. In this case, an authorised official will break the disposable locking element 22 and cut the bar 21 in its longer limb, on the trailing side (relative to insertion) of the hole 45. The leading end of the longer limb, which projects from the other side of the housing, can then be pulled, and the residual part of the bar 21 withdrawn from the housing. This is possible because the ramp 37 of the locking piece 36 will cooperate with the trailing end of the slot 38, whereby the locking member 27 is moved out of engagement with the residual part of the bar 21. The device is then relocked with a new bar 21 and new disposable locking element 22.

It is sometimes desirable for containers on aircraft to be openable while the aircraft is still on the ground, for example if there is a flight delay. This can be accommodated according to the present invention by modifying some locking devices so that the slot 38 is absent in the bar 21. The device is then not locked by the pressure-sensitive locking member 27, but is only locked by the disposable locking element 22. In a typical situation, a limited number of containers of the aircraft would be locked in this way, the remaining containers being locked in the full pressure-sensitive manner as described above.

A container on an aircraft may be locked by the device according to the invention by cooperation between the bar 21 and a hasp or other securing device on the container. Alternatively, a cable may be provided with loops at its end. The cable is then used to secure a container door in the closed position and the loops are held by the bar 21 which acts in the manner of a padlock.

What is claimed is:

1. A pressure-sensitive locking device comprising a housing having an opening in an external surface which communicates with a channel in the housing, an insertable elongate member having a leading portion and adapted to be slidingly inserted through the opening so that the leading portion is within the channel and the trailing portion remains outside the housing, and a locking member in the housing, the locking member being biased towards engagement with the leading portion of the insertable member so that the locking member is lockably engageable with the leading portion of the insertable member upon insertion of the insertable member into the housing, and the locking member being cooperable with a pressure-sensitive device in the housing to effect disengagement of the locking member from the insertable member, said pressure-sensitive device being actuatable upon a reduction of ambient pressure, whereupon the insertable member can be withdrawn from the housing.

2. A locking device according to claim 1, in which the locking member is pivotable.

3. A locking device comprising:
a housing having an opening which communicates with a channel in the housing,
an insertable elongate member adapted to be slidingly inserted through the opening and into the channel, and
a locking member in the housing, the locking member being biased towards engagement with the insertable member so that the locking member is lockably engageable with the insertable member upon insertion of the insertable member into the housing, the locking member being cooperable with a pressure-sensitive arrangement in the housing to effect disengagement of the locking member from the insertable member the pressure-sensitive arrangement being actuatable upon a reduction of ambient pressure, and wherein the pressure-sensitive arrangement comprises an expandable sealed capsule in abutment with a surface of the locking member, whereby expansion of the capsule causes movement of the locking member out of engagement with the insertable member.

4. A locking device according to claim 3, including means for permitting air to flow freely in or out of the capsule when the insertable member is totally or partially withdrawn from the housing.

5. A locking device according to claim 1, in which the pressure-sensitive device comprises a sealed capsule incorporated in the locking member, the capsule having an expandable surface in abutment with a surface in the housing, whereby a reduction in pressure causes expansion of the expandable surface and consequent movement of the locking member out of engagement with the insertable member.

6. A locking device comprising:
a housing having an opening which communicates with a channel in the housing,
an insertable elongate member adapted to be slidingly inserted through the opening and into the channel, and
a locking member in the housing, the locking member being biased towards engagement with the insertable member so that the locking member is lockably engageable with the insertable member upon insertion of the insertable member into the housing, the locking member being cooperable with a pressure-sensitive arrangement in the housing to effect disengagement of the locking member from the insertable member, the pressure-sensitive arrangement being actuatable upon a reduction of ambient pressure, and further comprising a secondary locking member adapted to lockably engage with the insertable member when an applied shock displaces the locking member out of engagement with the insertable member.

7. A locking device comprising:
a housing having an opening which communicates with a channel in the housing,
an insertable elongate member adapted to be slidingly inserted through the opening and into the channel, and
a locking member in the housing, the locking member being biased towards engagement with the insertable member so that the locking member is lockably engageable with the insertable member upon insertion of the insertable member into the housing, the locking member being cooperable with a pressure-sensitive arrangement in the housing to effect disengagement of the locking member from the insertable member, the pressure-sensitive arrangement being actuatable upon a reduction of ambient pressure, and wherein a step inside the housing is in abutment with the locking member so as to prevent the locking member becoming disengaged from the insertable member on application of a shock, and wherein further insertion of the insertable member into the housing moves the locking member out of abutment with the step, whereupon disengagement of the locking member from the insertable member becomes possible.

8. A locking device comprising:
a housing having an opening which communicates with a channel in the housing,
an insertable elongate member adapted to be slidingly inserted through the opening and into the channel, and
a locking member in the housing, the locking member being biased towards engagement with the insertable member so that the locking member is lockably engageable with the insertable member upon insertion of the insertable member into the housing, the locking member being cooperable with a pressure-sensitive arrangement in the housing to effect disengagement of the locking member from the insertable member, the pressure-sensitive arrangement being actuatable upon a reduction of ambient pressure, and further comprising a disposable locking element adapted to engage with one of the insertable member and the housing when the insertable member is in locking engagement with the locking member, whereupon breakage of part of the disposable locking element permits disengagement thereof from the one of the insertable member and from the housing.

9. A locking device to claim 8, in which the disposable locking element is adapted to lockably engage with one of the insertable member and the housing, whereby withdrawal of the insertable member from the housing is prevented even when the locking member is disengaged from the insertable member.

10. A locking device according to claim 8, in which the disposable locking element is formed of a plastic material and includes a head part and a plug part, the plug part being resiliently deformable so as to permit engagement with but resist disengagement from the one of the housing and the insertable member, and the head part including a tear line whereby manual manipulation of the head part will permit separation thereof from the plug part with resultant disengagement from the one of the housing and the insertable member.

* * * * *